Jan. 30, 1934.  F. H. BENGE  1,945,415
GEAR AND SEGMENTAL RIM FOR USE THEREIN
Original Filed May 31, 1932  3 Sheets—Sheet 1

Inventor:—
Frank H. Benge
by his Attorneys
Howson & Howson

Jan. 30, 1934.   F. H. BENGE   1,945,415
GEAR AND SEGMENTAL RIM FOR USE THEREIN
Original Filed May 31, 1932   3 Sheets-Sheet 2

Inventor:-
Frank H. Benge
by his Attorneys
Howson & Howson

Jan. 30, 1934.  F. H. BENGE  1,945,415
GEAR AND SEGMENTAL RIM FOR USE THEREIN
Original Filed May 31, 1932   3 Sheets-Sheet 3
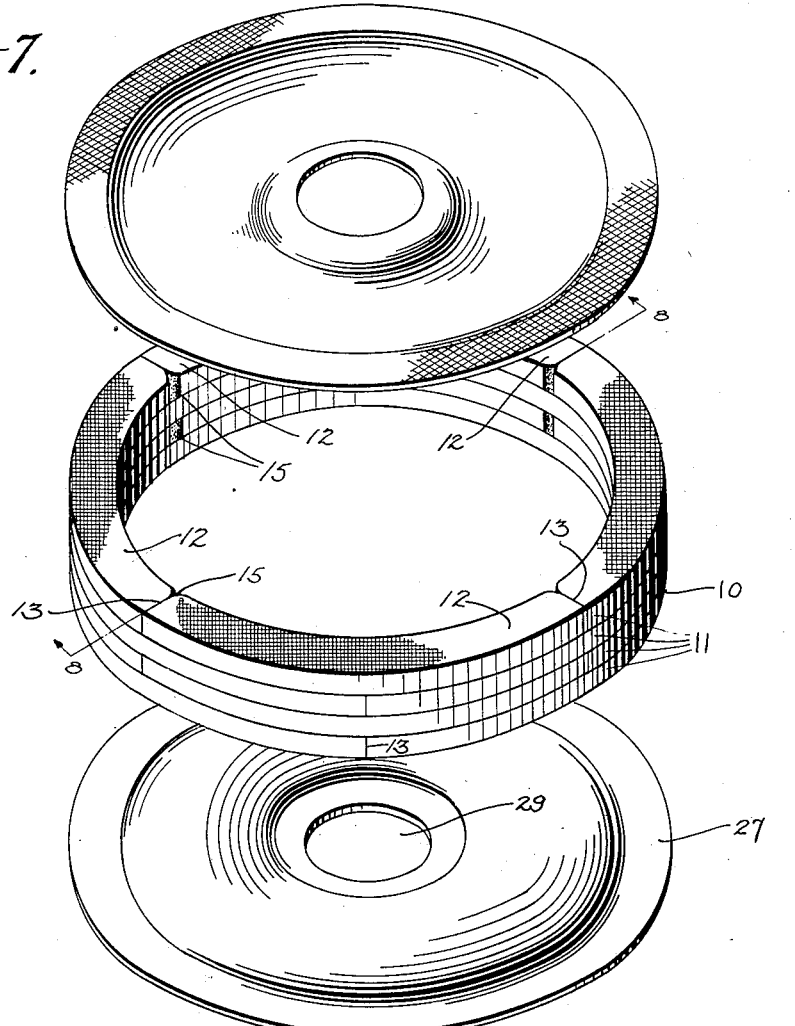
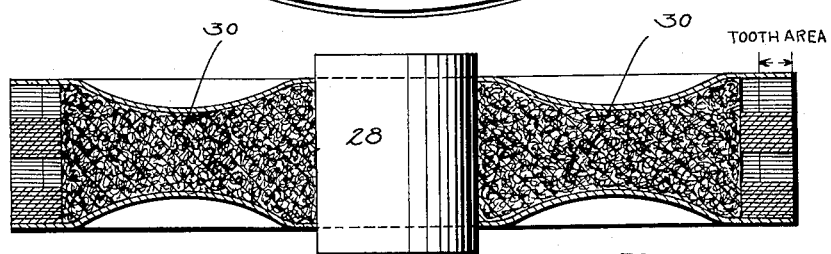
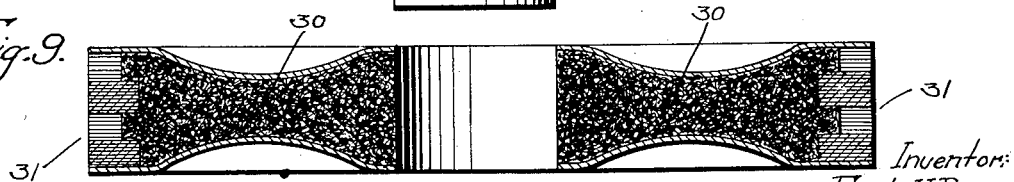
Inventor:
Frank H. Benge
by his Attorneys
Howson & Howson Patented Jan. 30, 1934

1,945,415

UNITED STATES PATENT OFFICE 1,945,415

GEAR AND SEGMENTAL RIM FOR USE THEREIN

Frank H. Benge, Norristown, Pa., assignor to Continental-Diamond Fibre Company, Newark, Del., a corporation of Delaware Original application May 31, 1932, Serial No. 614,650. Divided and this application March 31, 1933. Serial No. 663,839

6 Claims. (Cl. 74—28)

This invention relates to composite gears, and a rim for use therein, and is a division of my prior application Serial No. 614,650, filed May 31, 1932, for Method of producing segmental rims, which application is, in turn, a division of my preceding application Serial No. 438,879, filed March 25, 1930, for Method of and apparatus for producing segmental rims.

In the applications above identified, I have described a rim and method of producing the same wherein the rim is constructed of a plurality of relatively thick segments arranged in layers with the segments of each layer in end to end relation rather than in overlapping relation as in the case of rims of the ordinary construction. In the ordinary construction, the segments each comprise a single layer of material and these segments are ordinarily assembled by hand and then tied together. The structure thus produced is flimsy to handle, difficult of storage and incapable of any exact distribution of the body of the foundation material employed.

Important objects of this invention are the provision of a structure wherein the material is uniformly distributed throughout the rim and a structure provided which is readily temporarily bonded so that it may be stored indefinitely or if so desired transported from place to place.

A still further object of the invention is the provision of a gear in which the body and rim portions are firmly interlocked with one another by the foundation materials employed as well as by the artificial resin or other bonding agent employed therewith.

These and other objects I attain by the construction shown in the accompanying drawings wherein, for the purpose of illustration I have shown a preferred embodiment of my invention and wherein:

Fig. 7 is a combined perspective showing the rim and the cover members employed in the construction of a gear;

Fig. 8 is a sectional view showing the cover members and rim assembled and the web-forming material in position for completion of the web blank; and Fig. 9 is a sectional view through the completed gear blank illustrating the manner in which the web portions of the gear interlock with the rim.

Figure 2:
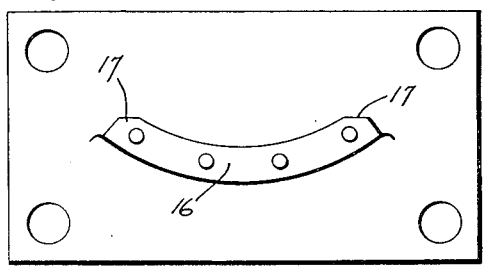
Figs. 2 and 3 are views illustrating dies for use in forming the segments.
Figure 3:
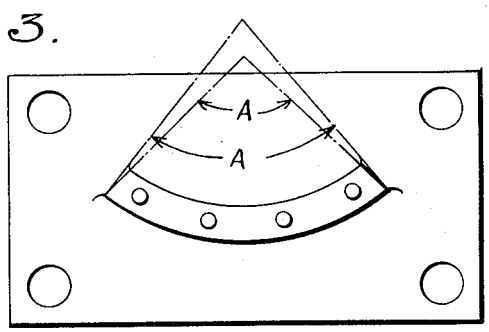
Figure 4:
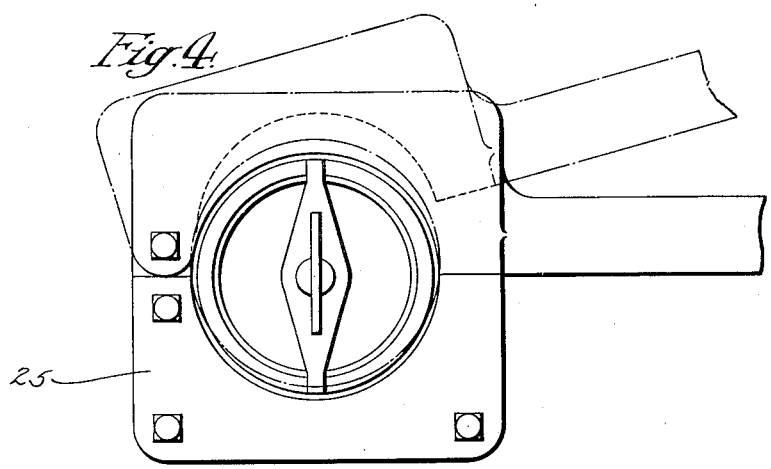
Fig. 4 is a plan view of the press used for constricting and shaping an annulus.
Figure 5:
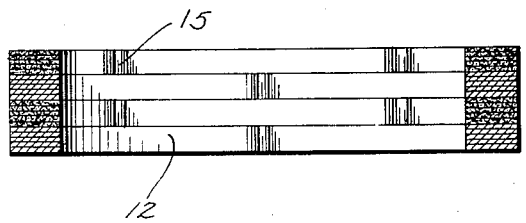
Figs. 5 and 6 are comparative views ilustrating the relative depths of the rim before and after treatment to render the bonding agent effective.
Figure 6:
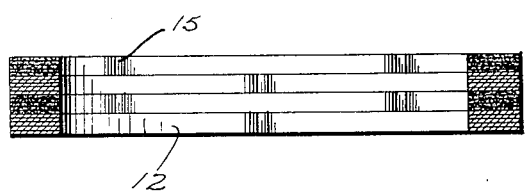

Referring now more particularly to the drawings, the numeral 10 generally designates a rim structure comprising a plurality of layers 11, each layer comprising a plurality of relatively thick segments 12 having adjacent ends in abutting non-overlapping relation, as indicated at 13. Each segment 12 comprises a plurality of individual sheets 14, as more clearly shown in Figs. 1, 5, 6, 8 and 9, and each segment has its outer face sub-tending a radial angle greater than the radial angle sub-tended by the inner face with the result that the rim segments when in end to end relation meet at the outer peripheral wall of the rim 10 but are spaced from one another at the inner peripheral wall with the result that voids 15 are formed in the inner peripheral wall of the rim for a purpose presently to appear. These rims may be either produced with a die such as shown in Fig. 2 in which the male member 16 of the die is formed with its inner corners dubbed at 17, or by a die such as shown in Fig. 3 in which the angle A between the end faces 18 of the male member 16a is greater than the radial angle A' subtending the outer face 19 of this member.

Figure 1:
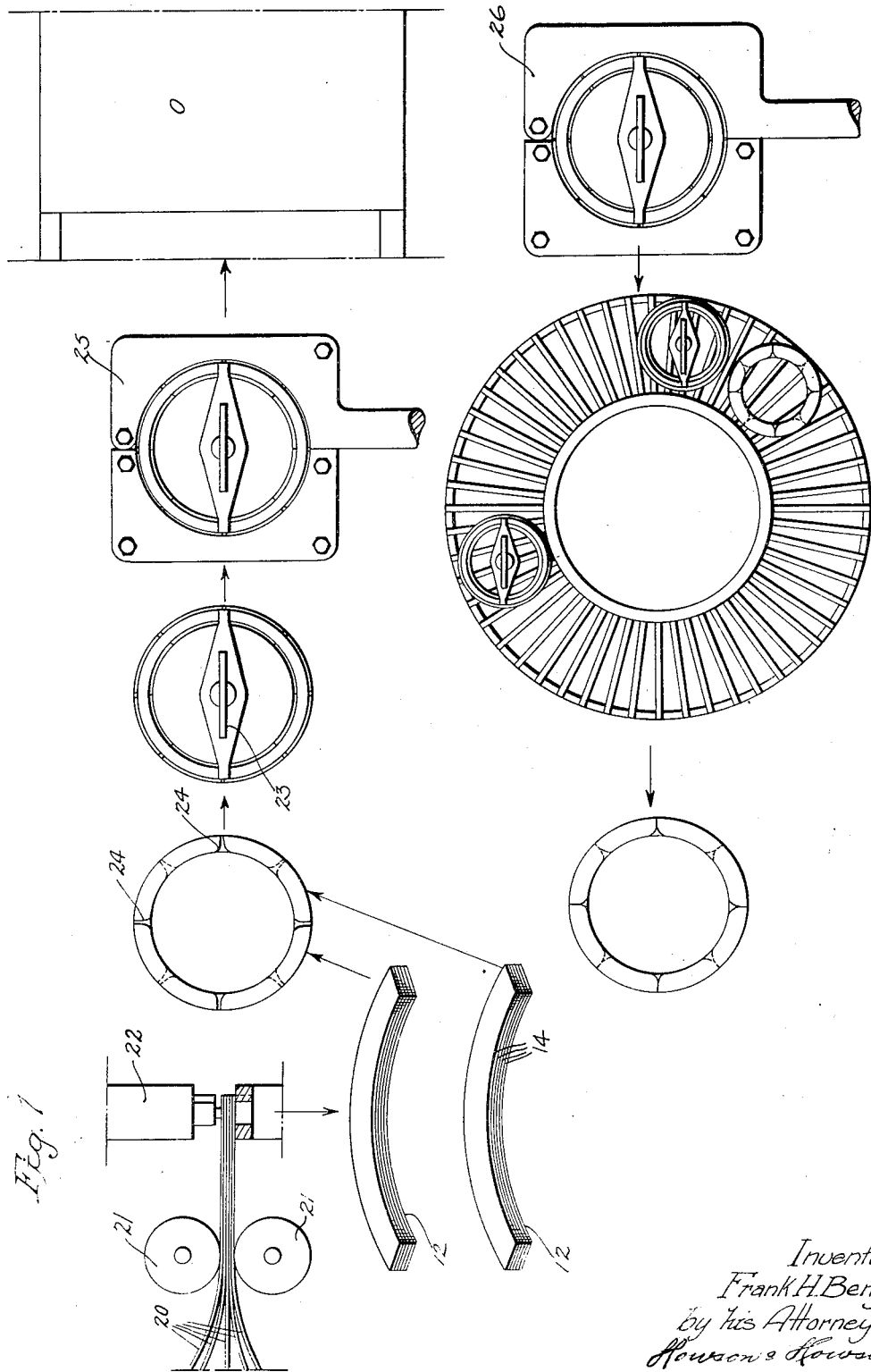
Fig. 1 is a composite diagram indicating the method of producing rims in acordance with my invention.

The rim is preferably produced by the method described in my prior applications above identified, said method being diagrammatically indicated in Fig. 1 of the drawings. In this figure the numeral 20 indicates strips of fabric impregnated with synthetic resin, preferably of the phenolic type, or some similar bonding agent. These strips are fed as a group through rollers 21 to a punch 22 incorporating dies such as illustrated in Figs. 2 or 3, the die simultaneously operating through all of the strips to produce the multi-layer segments 12. These segments are assembled with their adjacent ends spaced as indicated at 24, through suitable mechanism not herein completely illustrated, but comprising a spring clamp generally designated at 23. The spring clamp holds the rim in its roughly assembled form and the rim is then pased through a clamp 25 which constricts the rim radially and brings the ends of the segments into abutting relation at the outer peripheral wall of the rim. Use of segments of the type produced by the die of Fig. 2 is preferred since with this the segments abut throughout the toothed area of the gear, insuring a laminated structure in this area. Still held by the spring clamp, the rim is passed through an oven O after which it is subjected to the action of clamp 26 similar to clamp 25 in order that any malformation resulting from the heat treatment may be removed. The oven treatment is carried out at a sufficient temperature, and for a sufficient time to cause fusion of the binder and partial conversion thereof. Care is taken, however, not to carry the treatment to the point where the resin is converted to its final infusible stage in case synthetic resin is employed. The rim is then cooled and may be removed from the clamp and stored in any suitable place, the oven treatment having sufficiently bonded the elements of the rim that it may be manipulated as a unit. These units may be either employed immediately or placed in storage.

In their use in constructing a gear, fabric end plates 27 are employed, one being placed beneath the rim, following which a hub 28 is placed through a central opening 29 in the end plate and a filling 30 placed in the annular space defined by the rim and hub. A second end plate is then placed over this filling, as indicated in Fig. 8. The filling 30 may be of any suitable character, but preferably comprises small pieces of resin-treated fabric impregnated with the same bonding material as employed in the rim, the size of the pieces employed being such that at least some of them readily enter the voids 15 in the inner wall of the rim. Advantageously, the filling material 30 is composed of small pieces of scrap material cut to suitable size, resulting from the cutting of the rim segments by the die, as hereinbefore described. The unit is then subjected to heat and pressure for the conversion of the bonding agent to its final infusible stage, if a synthetic resin is employed, and this heat and pressure treatment causes the material 30 with its impregnating compound to enter the voids and form firm interlocks between the gear body and the rim, as more clearly shown at 31 in Fig. 9, whereby a strong unitary article is produced. By employing this procedure, the presence of resin pockets, or portions in the rim which are composed entirely of the bonding agent, is eliminated and even distribution of the material throughout the rim assured.

I claim:

1. A rim for gears or the like comprising a plurality of layers of relatively thick segments arranged in end-to-end relation, each segment comprising a plurality of sheets of fabric impregnated with a synthetic resin or the like, the end faces of adjacent segments meeting at the outer peripheral wall of the rim and being spaced from one another at the inner peripheral wall of the rim.

2. A rim for gears or the like comprising a plurality of layers of relatively thick segments arranged in end-to-end relation, each segment comprising a plurality of sheets of fabric impregnated with a synthetic resin or the like, the segments of each layer being staggered with relation to those of adjacent layers, the end faces of adjacent segments meeting at the outer peripheral wall of the rim and being spaced from one another at the inner peripheral wall of the rim.

3. A rim for use in the production of fibre gears, comprising a laminated segmental structure, the segments of which have the end faces thereof formed to provide voids at the inner face of the rim.

4. A bonded segmental rim structure wherein the segments have the end faces thereof cut upon an angle greater than the angle subtending the segments whereby voids are formed at the inner face of the rim.

5. A bonded segmental rim structure wherein each segment has an outer face of a length to subtend a radial angle greater than the radial angle subtended by the inner face of the segment whereby notches are formed at the inner face of the rim.

6. A rim for gears or the like comprising a plurality of layers of relatively thick laminated segments arranged in end to end relation, the end faces of adjacent segments meeting at the outer peripheral wall of the rim and inwardly therefrom throughout the toothed area of the rim and being spaced from one another at the inner peripheral wall of the rim to provide voids in said wall.

FRANK H. BENGE.